(12) United States Patent
Amano (10) Patent No.: US 12,173,795 B2
(45) Date of Patent: Dec. 24, 2024

(54) GASKET AND SEALING STRUCTURE

(71) Applicant: NOK CORPORATION, Tokyo (JP)

(72) Inventor: Takuya Amano, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 64 days.

(21) Appl. No.: 17/908,571

(22) PCT Filed: Apr. 19, 2021

(86) PCT No.: PCT/JP2021/015812
§ 371 (c)(1),
(2) Date: Sep. 1, 2022

(87) PCT Pub. No.: WO2021/220858
PCT Pub. Date: Nov. 4, 2021

(65) Prior Publication Data
US 2023/0175585 A1    Jun. 8, 2023

(30) Foreign Application Priority Data

May 1, 2020    (JP) .................................. 2020-081013

(51) Int. Cl.
*F16J 15/12*    (2006.01)
(52) U.S. Cl.
CPC .................................. *F16J 15/122* (2013.01)
(58) Field of Classification Search
CPC .............................. F16J 15/121; F16J 15/122
See application file for complete search history.

(56) References Cited

U.S. PATENT DOCUMENTS

| 3,554,567 A | * | 1/1971 | Carroll et al. | ......... | F16J 15/106 |
| | | | | | 285/349 |
| 3,635,480 A | | 1/1972 | Bain et al. | | |
| 4,426,086 A | * | 1/1984 | Fournie | .................. | G01M 3/022 |
| | | | | | 277/572 |
| 4,881,570 A | * | 11/1989 | Ziebach | ................. | F16J 15/122 |
| | | | | | 137/454.2 |

(Continued)

FOREIGN PATENT DOCUMENTS

| GB | 853996 | 11/1960 |
| JP | 10-26228 A | 1/1998 |

(Continued)

OTHER PUBLICATIONS

International Search Report International Patent Application No. PCT/JP2021/015812, dated Jun. 29, 2021, English translation.

(Continued)

*Primary Examiner* — Eugene G Byrd
(74) *Attorney, Agent, or Firm* — GREENBLUM & BERNSTEIN, P.L.C.

(57) ABSTRACT

A gasket and a sealing structure that are capable of stabilizing posture of the gasket installed in a narrow space. A gasket main body has: an annular lip portion pressed by a facing surface of a second member facing a first member so that the lip portion is in close contact with the facing surface while being bent inward; a first annular protrusion in close contact with an end surface of the mount portion facing the second member; and a second annular protrusion provided inward with respect to the first annular protrusion and in close contact with the end surface.

2 Claims, 5 Drawing Sheets

(56) References Cited

U.S. PATENT DOCUMENTS

| | | | | |
|---|---|---|---|---|
| 5,409,337 | A * | 4/1995 | Muyskens | F16J 15/062 |
| | | | | 285/379 |
| 5,618,050 | A * | 4/1997 | Jeanne | F16J 15/123 |
| | | | | 277/591 |
| 10,527,208 | B2 * | 1/2020 | Grouillet | F16L 17/035 |
| 2007/0170656 | A1 * | 7/2007 | Schleker | F16J 15/3236 |
| | | | | 277/549 |
| 2008/0036159 | A1 | 2/2008 | Yanagi | |
| 2008/0252020 | A1 * | 10/2008 | Heiman | F16J 15/121 |
| | | | | 277/593 |
| 2011/0233438 | A1 * | 9/2011 | Hubacek | F16K 5/20 |
| | | | | 251/314 |
| 2015/0014941 | A1 * | 1/2015 | Yanagiguchi | F16J 15/3204 |
| | | | | 277/549 |
| 2019/0032783 | A1 * | 1/2019 | Yanagi | F16J 15/12 |
| 2019/0203837 | A1 * | 7/2019 | Cann | F16L 23/18 |
| 2020/0191273 | A1 * | 6/2020 | Yanagi | F16J 15/061 |
| 2021/0108726 | A1 * | 4/2021 | Makinae | F16J 15/127 |
| 2021/0123528 | A1 * | 4/2021 | Byrne | F16J 15/025 |
| 2021/0164570 | A1 * | 6/2021 | Amano | F16J 15/121 |

FOREIGN PATENT DOCUMENTS

| | | | | |
|---|---|---|---|---|
| JP | 2012-67790 | A | 4/2012 | |
| JP | 2019082242 | A * | 5/2019 | B62D 1/02 |
| JP | 2020-16298 | A | 1/2020 | |
| WO | 2006/077677 | A1 | 7/2006 | |
| WO | 2017/135337 | A1 | 8/2017 | |
| WO | 2018/193766 | A1 | 10/2018 | |
| WO | WO-2019093012 | A1 * | 5/2019 | F16J 15/025 |

OTHER PUBLICATIONS

Extended European Search Report issued in EP Application No. 21796228.1, dated Apr. 18, 2024.

\* cited by examiner

GASKET AND SEALING STRUCTURE

TECHNICAL FIELD

The present invention relates to a gasket and a sealing structure for sealing a gap between two members fixed to each other.

BACKGROUND ART

A gasket for sealing a gap between two members fixed to each other tends to be installed in a space with a short length in a width direction (a direction perpendicular to a direction of compression between the two members) due to, for example, a reduction in size of a device. In this case, the gasket may have a cross-sectional shape that is longer in a vertical direction, resulting in an unstable posture, which may adversely affect the sealing performance due to, for example, fall of the gasket when compressed by the two members. In order to stabilize the posture of the gasket when compressed by the two members, a configuration having a portion that easily falls outward or inward has been considered. However, increasing reduction in size of devices, for example, may make it difficult for gaskets to maintain their posture.

CITATION LIST

Patent Literature

[PTL 1]
WO 2018/193766

SUMMARY OF INVENTION

Technical Problem

It is an object of the present invention to provide a gasket and a sealing structure capable of stabilizing the posture of the gasket installed in a narrow space.

Solution to Problem

The present invention adopts the following means to achieve the above object.

A gasket according to the present invention is a gasket configured to seal a gap between a first member and a second member fixed to the first member, the first member having an opening and a mount portion provided along an edge of the opening, the mount portion having an annular and cutout shape, the gasket including:

a reinforcing ring having:

a body portion extending from the first member side toward the second member side; and a bent portion bent inward from an end of the body portion on the first member side; and a gasket main body made of an elastic body provided integrally with the reinforcing ring, wherein the gasket main body has:

an annular lip portion configured to be pressed by a facing surface of the second member facing the first member so that the lip portion is in close contact with the facing surface while being bent inward;

a first annular protrusion configured to be in close contact with an end surface of the mount portion facing the second member; and a second annular protrusion provided inward with respect to the first annular protrusion and configured to be in close contact with the end surface.

Furthermore, a sealing structure of the present invention is a sealing structure having:

a first member having an opening and a mount portion provided along an edge of the opening, the mount portion having an annular and cutout shape;

a second member fixed to the first member; and a gasket sealing a gap between the first member and the second member, wherein the gasket has:

a reinforcing ring having:

a body portion extending from the first member side toward the second member side; and a bent portion bent inward from an end of the body portion on the first member side; and a gasket main body made of an elastic body provided integrally with the reinforcing ring, and the gasket main body has:

an annular lip portion pressed by a facing surface of the second member facing the first member so that the lip portion is in close contact with the facing surface while being bent inward;

a first annular protrusion being in close contact with an end surface of the mount portion facing the second member; and a second annular protrusion provided inward with respect to the first annular protrusion and being in close contact with the end surface.

According to these inventions, the reinforcing ring maintains the rigidity of the gasket. Also, when the first and second members compress the gasket, the lip portion is in close contact with the facing surface of the second member, and the first annular protrusion and the second annular protrusion are in close contact with the end surface of the mount portion of the first member. At this time, the lip portion is bent inward. This stabilizes the behavior of the lip portion. The first annular protrusion and the second annular protrusion are both configured to be in close contact with the end surface of the mount portion. This prevents the first annular protrusion and the second annular protrusion from moving outward or inward. The combination of these factors stabilizes the posture of the gasket.

Furthermore, the gasket main body may have an outer peripheral annular protrusion that is in close contact with an inner peripheral surface of the mount portion.

This prevents the gasket from falling from the first member and being displaced relative to the first member after the gasket is installed in the first member.

The amount of compression of the second annular protrusion compressed by the end surface may be less than the amount of compression of the first annular protrusion compressed by the end surface.

By configuring the first annular protrusion and the second annular protrusion to have different compression amounts as described above, the behavior of the gasket compressed by the first member and the second member is further stabilized.

In addition, the above configurations can be adopted in combination to the extent possible.

Advantageous Effects of Invention

As described above, according to the present invention, the posture of a gasket installed in a narrow space can be stabilized.

DESCRIPTION OF EMBODIMENTS

Referring to the drawings, modes for carrying out the present invention are described in detail based on embodiments. However, the dimensions, materials, shapes, relative arrangements, and the like of the components described in these embodiments are not intended to limit the scope of the present invention thereto unless otherwise specified.

Embodiment 1

Figure 1:
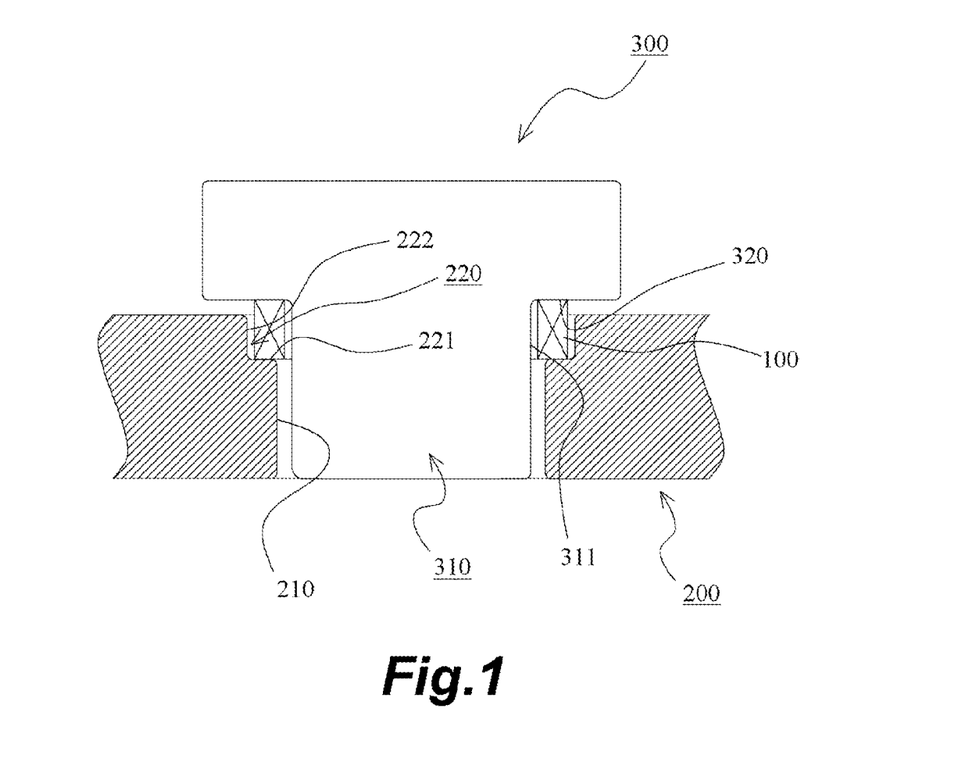
FIG. 1 is a schematic view of a sealing structure according to an embodiment of the present invention.
Figure 2:
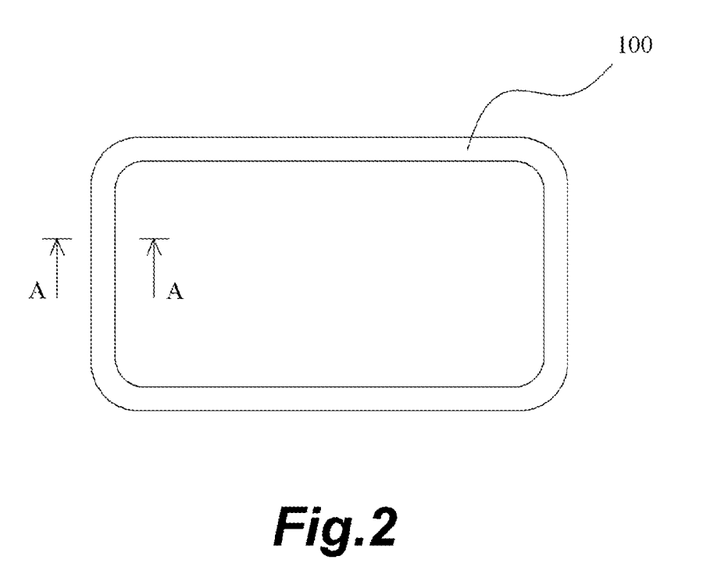
FIG. 2 is a schematic plan view of a gasket according to an embodiment of the present invention.
Figure 3:
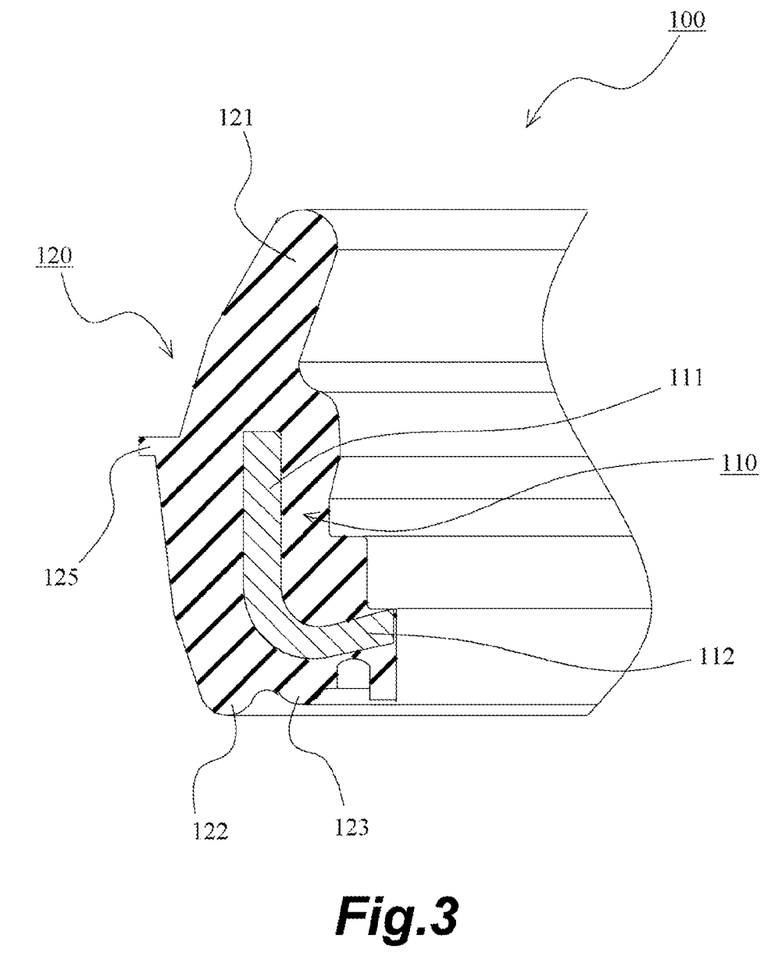
FIG. 3 is a schematic cross-sectional view of the gasket according to Embodiment 1 of the present invention.
Figure 4:
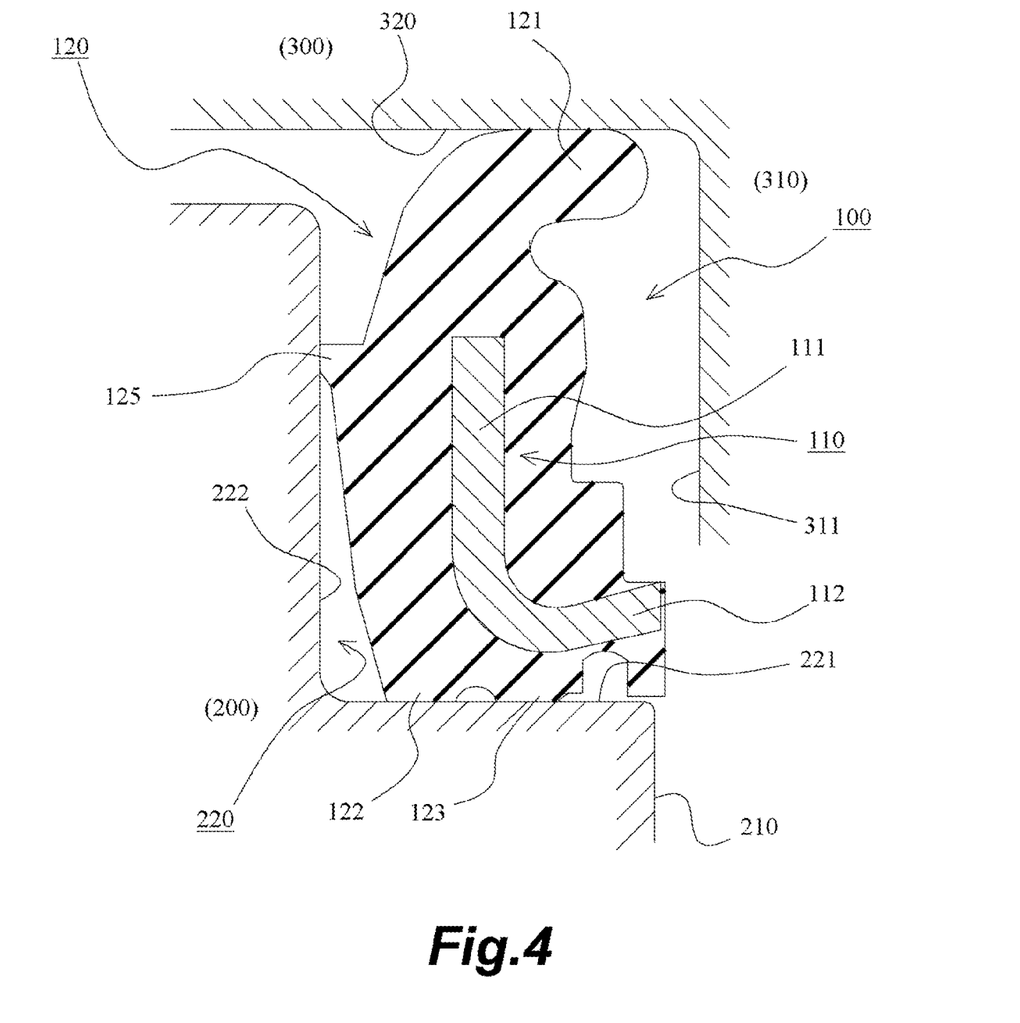
FIG. 4 is a schematic cross-sectional view of the sealing structure according to Embodiment 1 of the present invention.

Referring to FIGS. 1 to 4, a gasket and a sealing structure according to Embodiment 1 of the present invention are described. FIG. 1 is a schematic view of a sealing structure according to an embodiment of the present invention. FIG. 1 is a simplified diagram of members forming the sealing structure and partly shows a cross-section. FIG. 2 is a schematic plan view of a gasket according to the embodiment of the present invention, and is a simplified plan view of the gasket. FIG. 3 is a schematic cross-sectional view of the gasket according to Embodiment 1 of the present invention, and is a cross-sectional view taken along line A-A in FIG. 2. FIG. 4 is a schematic cross-sectional view of the sealing structure according to Embodiment 1 of the present invention. The gasket in FIG. 4 corresponds to a cross-sectional view taken along line A-A in FIG. 2.

<Outline of Sealing Structure>

Referring to FIG. 1 in particular, an outline of the sealing structure according to the present embodiment is described. The sealing structure according to the present embodiment includes a first member 200, a second member 300, which is fixed to the first member 200, and a gasket 100, which seals a gap between the first member 200 and the second member 300. The first member 200 has an opening 210 and a mount portion 220 provided along an edge of the opening 210. The mount portion 220 has an annular and cutout shape. Furthermore, in the present embodiment, the second member 300 includes an insertion portion 310 inserted in the opening 210 of the first member 200. The gasket 100 is configured to be mounted on the mount portion 220 of the first member 200 to seal the gap between the first member 200 and the second member 300. In one embodiment, the second member 300 is a connector and the first member 200 is a housing to which the connector is mounted.

<Gasket>

Referring to FIGS. 2 and 3 in particular, the gasket 100 according to the present embodiment is described. In a plan view, the gasket 100 according to this embodiment has a substantially rectangular inner peripheral surface and a substantially rectangular outer peripheral surface (see FIG. 2). The gasket 100 has a planar shape corresponding to an outer shape of the opening 210 of the first member 200 and the second member 300. Note that the planar shape of the gasket according to the present invention is not limited to the illustrated example, and various shapes may be adopted (for example, an annular gasket may have a circular planar shape).

The gasket 100 according to the present embodiment includes a reinforcing ring 110, which is made of metal or the like, and a gasket main body 120, which is made of an elastic body (for example, made of rubber) provided integrally with the reinforcing ring 110. A manufacturing method for the gasket 100 may include, for example, molding the gasket main body 120 by insert molding using the reinforcing ring 110 as an insert component.

The reinforcing ring 110 has a body portion 111, which extends from the first member 200 side toward the second member 300 side, and a bent portion 112, which is bent inward from an end of the body portion 111 on the first member 200 side. More specifically, the body portion 111 is formed of a tubular portion, and a distal end thereof is partly bent inward to form the annular bent portion 112.

The gasket main body 120 includes an annular lip portion 121, which is provided on an end side of the body portion 111 of the reinforcing ring 110, the end locating on an opposite side to the bent portion 112, and a first annular protrusion 122 and a second annular protrusion 123, which are provided on the bent portion 112 side. The lip portion 121 is configured to incline inward from the end of the body portion 111 toward a tip of the lip portion 121. The first annular protrusion 122 and the second annular protrusion 123 are each configured to extend straight from a base of the protrusion to a tip of the protrusion. The second annular protrusion 123 is provided inward with respect to the first annular protrusion 122. Furthermore, a height in a protruding direction of the second annular protrusion 123 is less than that of the first annular protrusion 122.

The gasket main body 120 according to the present embodiment includes an outer peripheral annular protrusion 125 on an outer peripheral surface of the gasket main body 120.

<Details of Sealing Structure>

Referring to FIG. 4 in particular, the sealing structure according to the present embodiment is described in further detail. In a state in which the first member 200 is fixed to the second member 300, the lip portion 121 of the gasket main body 120 is in close contact with a facing surface 320 of the second member 300 facing the first member 200. Also, the mount portion 220 of the first member 200 includes an end surface 221 facing the second member 300 and an inner peripheral surface 222 facing the outer peripheral surface 311 of the insertion portion 310 of the second member 300. The first annular protrusion 122 and the second annular protrusion 123 of the gasket main body 120 are configured to be in close contact with the end surface 221 of the mount portion 220. Furthermore, the outer peripheral annular protrusion 125 of the gasket main body 120 is configured to be in close contact with the inner peripheral surface 222 of the mount portion 220.

<Advantageous Points of Gasket and Sealing Structure According to Present Embodiment>

According to the gasket 100 of the present embodiment, since the reinforcing ring 110 is provided, the rigidity of the gasket 100 is maintained. The lip portion 121 of the gasket main body 120 is configured to incline inward from the end of the body portion 111 of the reinforcing ring 110 toward the tip of the lip portion 121. Accordingly, when the first member 200 and the second member 300 compress the gasket 100, the lip portion 121 is pressed by the facing surface 320 of the second member 300 facing the first member 200 so that the lip portion 121 is in close contact with the facing surface 320 while being bent inward. This stabilizes the behavior of the lip portion 121.

The first annular protrusion 122 and the second annular protrusion 123 are each configured to extend straight from the base of the protrusion to the tip of the protrusion. Thus, when the gasket 100 is compressed, the first annular protrusion 122 and the second annular protrusion 123 are compressed without being tilted inward or outward. Since the first annular protrusion 122 and the second annular protrusion 123 are both configured to be in close contact with the end surface 221 of the mount portion 220, the first annular protrusion 122 and the second annular protrusion 123 are unlikely to move outward or inward.

The combination of these factors stabilizes the posture of the gasket 100. The stable sealing performance is thus achieved even if an installation space for the gasket 100 is narrow, especially in a case where a length in a width direction (a direction perpendicular to the direction of the compression by the first member 200 and the second member 300) is short. This allows the posture of the gasket 100 to be kept in an environment where, for example, a pressure inside the gasket 100 (internal pressure) is higher than a pressure outside the gasket 100, resulting in stable sealing performance. Also, even in a case where the mount portion in which the gasket 100 is mounted has a relatively large dimensional tolerance due to easily deformable material of the first member 200 and the second member 300, the posture of the gasket 100 can be stabilized, achieving stable sealing performance.

In addition, with the gasket 100 according to the present embodiment, the outer peripheral annular protrusion 125 is configured to be in close contact with the inner peripheral surface 222 of the mount portion 220. This prevents the gasket 100 from falling from the first member 200 and being displaced relative to the first member 200 after the gasket 100 is installed in the first member 200.

In the present embodiment, the height in the protruding direction of the second annular protrusion 123 is less than that of the first annular protrusion 122. As a result, an amount of compression of the second annular protrusion 123 compressed by the end surface 221 is less than an amount of compression of the first annular protrusion 122 compressed by the end surface 221. By configuring the first annular protrusion 122 and the second annular protrusion 123 to have different compression amounts as described above, the behavior of the gasket 100 compressed by the first member 200 and the second member 300 is further stabilized.

Embodiment 2

Figure 5:
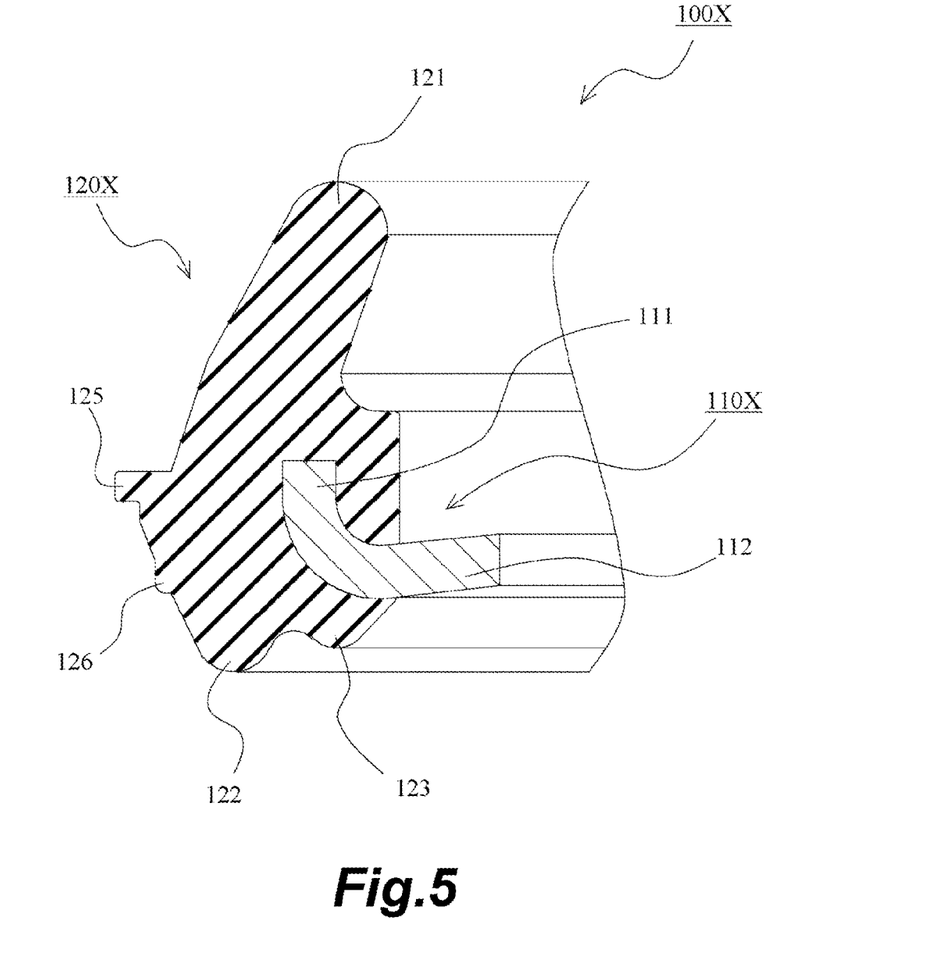
FIG. 5 is a schematic cross-sectional view of a gasket according to Embodiment 2 of the present invention.

FIG. 5 shows Embodiment 2 according to the present invention. In this embodiment, a shape of a reinforcing ring and a configuration of a gasket main body are partly different from Embodiment 1 described above. Meanwhile, since configurations and operations of Embodiment 2 are basically the same as those of Embodiment 1, the same components will be denoted by the same reference sings and descriptions thereof will be omitted.

FIG. 5 is a schematic cross-sectional view of a gasket according to Embodiment 2 of the present invention, and is a cross-sectional view taken along line A-A in FIG. 2. A gasket 100X according to the present embodiment includes a reinforcing ring 110X, which is made of metal or the like, and a gasket main body 120X, which is made of an elastic body (for example, made of rubber) provided integrally with the reinforcing ring 110X. A manufacturing method for the gasket 100X of the present embodiment may include, for example, molding the gasket main body 120X by insert molding using the reinforcing ring 110X as an insert component.

As with Embodiment 1, the reinforcing ring 110X according to the present embodiment has a body portion 111 and a bent portion 112. In addition, the gasket main body 120X according to the present embodiment includes an annular lip portion 121, a first annular protrusion 122, and a second annular protrusion 123 in the same manner as Embodiment 1. Since the configurations of the lip portion 121, the first annular protrusion 122, and the second annular protrusion 123 are the same as in Embodiment 1, the descriptions thereof are omitted.

As with Embodiment 1, an outer peripheral annular protrusion 125 is provided on an outer peripheral surface of the gasket main body 120X. The present embodiment further includes an annular small protrusion 126 between the first annular protrusion 122 and the outer peripheral annular protrusion 125 at a position that does not affect a sealing performance. The small protrusion 126 is provided to be used to identify a type or the like of the gasket 100, and is not necessarily required.

Since the configuration of the sealing structure including the gasket 100X according to the present embodiment is the same as that of Embodiment 1, the description thereof is omitted. The gasket 100X and the sealing structure of the present embodiment configured as described above have the same advantages as Embodiment 1.

The above embodiments describe an example of a configuration of the first member 200 and the second member 300 in which the insertion portion 310 of the second member 300 is inserted into the opening 210 of the first member 200 (like a connector and a housing). However, the first member and the second member of the present invention are not limited to this configuration. For example, a gasket and a sealing structure according to the present invention are also applicable to a sealing structure of a portion connecting tubes to each other.

REFERENCE SIGNS LIST 100, 100X Gasket
110, 110X Reinforcing ring
111 Body portion
112 Bent portion
120, 120X Gasket main body
121 Lip portion
122 First annular protrusion
123 Second annular protrusion
125 Outer peripheral annular protrusion
126 Small protrusion
200 First member
210 Opening
220 Mount portion
221 End surface
222 Inner peripheral surface
300 Second member
310 Insertion portion
320 Facing surface

The invention claimed is:

1. A gasket configured to seal a gap between a first member and a second member fixed to the first member, the first member having an opening and a mount portion provided along an edge of the opening, the mount portion having an annular and cutout shape, the gasket comprising:
    a reinforcing ring having:
        a body portion extending from the first member side toward the second member side and the body portion having a central axis; and
        a bent portion bent inward from an end of the body portion on the first member side; and
    a gasket main body made of an elastic body provided integrally with the reinforcing ring, wherein
    the gasket main body has:
        an annular lip portion configured to be pressed by a facing surface of the second member facing the first member so that the lip portion is in close contact with the facing surface while being bent inward;
        a first annular protrusion configured to be in close contact with an end surface of the mount portion facing the second member;
        a second annular protrusion provided inward with respect to the first annular protrusion and configured to be in close contact with the end surface, wherein
        the second annular protrusion is defined by an inner surface that diverges from the central axis in a direction of protrusion of the second annular protrusion and an outer surface that converges towards the central axis in the direction of protrusion of the second annular protrusion, and wherein
        a height of the first annular protrusion is greater than a height of the second annular protrusion such that the first annular protrusion protrudes farther than the second annular protrusion from an axial end of the gasket main body; and
        an outer peripheral annular protrusion positioned radially outward of the first annular protrusion and configured to be in close contact with an inner peripheral surface of the mount portion.

2. A sealing structure comprising:
    a first member having an opening and a mount portion provided along an edge of the opening, the mount portion having an annular and cutout shape;
    a second member fixed to the first member; and
    a gasket sealing a gap between the first member and the second member, wherein
    the gasket has:
        a reinforcing ring having:
            a body portion extending from the first member side toward the second member side and the body portion having a central axis; and
            a bent portion bent inward from an end of the body portion on the first member side; and
        a gasket main body made of an elastic body provided integrally with the reinforcing ring, and
    the gasket main body has:
        an annular lip portion pressed by a facing surface of the second member facing the first member so that the lip portion is in close contact with the facing surface while being bent inward;
        a first annular protrusion being in close contact with an end surface of the mount portion facing the second member;
        a second annular protrusion provided inward with respect to the first annular protrusion and being in close contact with the end surface, wherein
        the second annular protrusion is defined by an inner surface that diverges from the central axis in a direction of protrusion of the second annular protrusion and an outer surface that converges towards the central axis in the direction of protrusion of the second annular protrusion, and
    wherein
        a height of the first annular protrusion is greater than a height of the second annular protrusion such that the first annular protrusion protrudes farther than the second annular protrusion from an axial end of the gasket main body; and
        an outer peripheral annular protrusion positioned radially outward of the first annular protrusion and being in close contact with an inner peripheral surface of the mount portion.

* * * * *